3,647,678
PROCESS FOR PRODUCING HIGH YIELDS OF
LOW FREEZE POINT JET FUEL
Clark J. Egan, Piedmont, Calif., assignor to Chevron
Research Company, San Francisco, Calif.
Filed Mar. 17, 1970, Ser. No. 20,238
Int. Cl. C10g 13/04, 37/02
U.S. Cl. 208—59                                    7 Claims

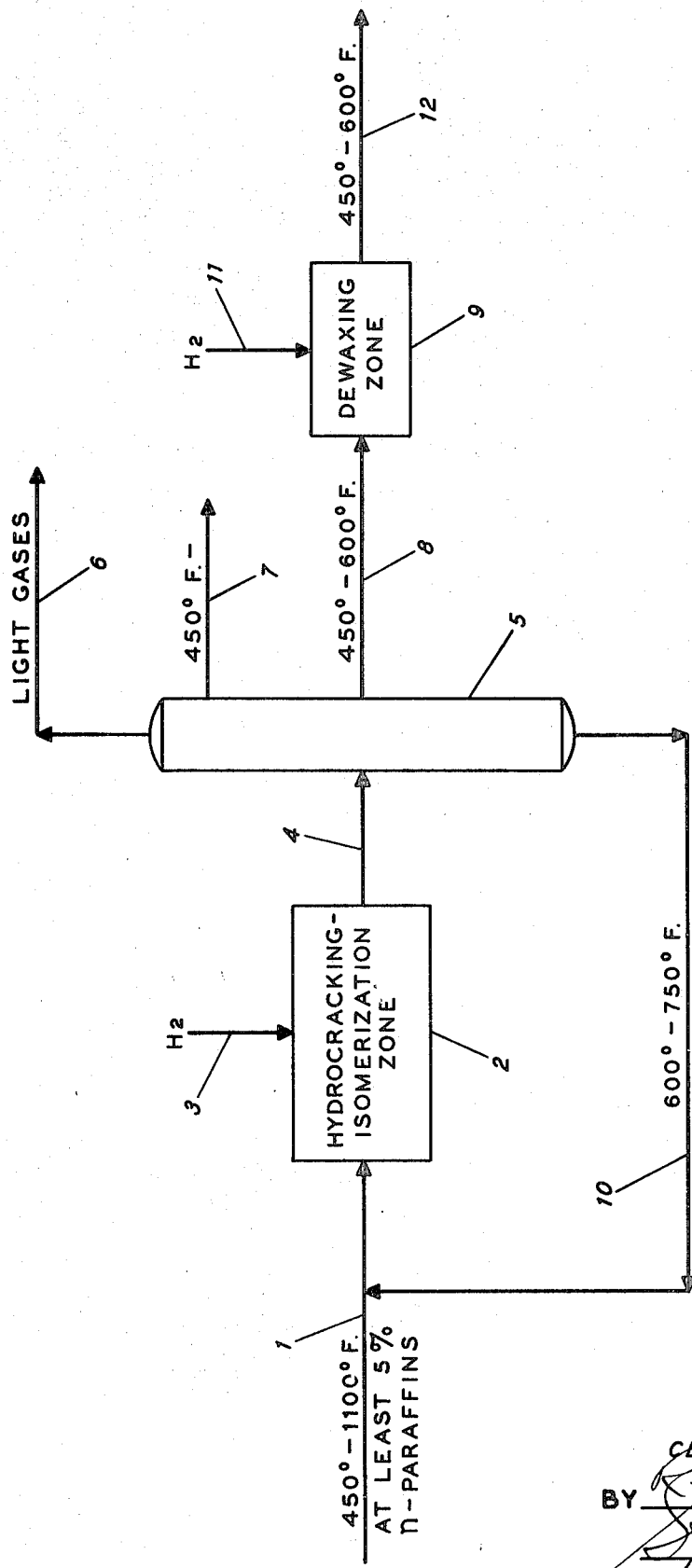

ABSTRACT OF THE DISCLOSURE

Process for obtaining a high yield of low freeze point jet fuel from a hydrocarbon feedstock containing materials boiling above the jet fuel boiling range and containing at least 5 volume percent normal paraffins which comprises subjecting said feedstock to hydrocracking and isomerization in the presence of hydrogen and a catalyst comprising a crystalline zeolitic molecular seive component substantially free of any catalytic metal or metals, a silica-containing gel component, a Group VI hydrogenating component and a Group VIII hydrogenating component, whereby the amount of jet fuel boiling range materials is increased and normal paraffins are isomerized, and selectively hydrocracking the remaining normal paraffins in the presence of hydrogen and a catalyst comprising mordenite in hydrogen form and at least one hydrogenating component.

INTRODUCTION

This invention relates to jet fuel production, and more particularly to production of high yields of low freeze point jet fuel from hydrocarbon feedstocks containing materials boiling above the jet fuel boiling range.

PRIOR ART

The necessity for jet fuels to be characterized by low freeze points is well known, and is reflected in all military and commercial jet fuel specifications. Many patents have been issued directed to various processes for producing low freeze point jet fuels, for example U.S. Pat. 3,110,662. Said patent also indicates that it is known to hydrocrack hydrocarbon feedstocks containing materials boiling above the jet fuel boiling range, to produce jet fuels.

Catalytic dewaxing of hydrocarbon oils is well known in the art and refers to the reduction of the normal paraffin content of the oils by mere physical removal of normal paraffns without conversion thereof.

Copending Egan U.S. patent application Ser. No. 771,880 now Pat. No. 3,539,495 adequately discusses the reasons for catalytic dewaxing of hydrocarbon oils, including reasons why continuing efforts are being made in the petroleum industry to find improved dewaxing catalysts and processes.

A recent development in the area of catalytic dewaxing is provided by accomplishing catalytic dewaxing with a catalyst comprising a crystalline aluminosilicate zeolite in hydrogen form having uniform pore openings with a minor pore diameter as determined by crystallography of not less than 5.8 and a major pore diameter less than 8 angstroms at a temperature of at least 450° F., as disclosed in Texaco Development Corporation, Republic of South Africa Patent 67/3685 corresponding to U.S. Pat. No. 3,539,498. The zeolite having the required characteristics is a mordenite-type zeolite. It is highly preferable that the mordenite be in hydrogen form; the sodium form, for example, produces inferior dewaxing results. A catalytic material, suitably a Group VIII metal, preferably a platinum group metal, preferably is associated with the zeolite. The decationized mordenite-type zeolite structures have pore sizes sufficiently large to admit not only the straight-chain hydrocarbons which it is desired to selectively convert to lower molecular weight materials, but also cyclic hydrocarbons; in contrast, the straight-chain hydrocarbons alone are selectively admitted to 5-angstrom molecular sieves, the pores of which quickly become saturated with waxy components, causing catalyst deactivation. Accordingly, the decationized mordenite zeolite structures have a greater capacity for sustained selective conversion of straight-chain components than to 5-angstrom molecular sieves. The mordenite-type zeolite has a chain-type zeolite structure in which a number of chains are linked together into a structural pattern with parallel sorption channels similar to a bundle of parallel tubes, in contrast with the three-dimensional structural lattices which are characteristic of molecular sieve zeolites such as Y-type faujasites. The mordenite-type zeolite dewaxing catalyst preferably comprises a Group VIII hydrogenating component, particularly nickel, platinum, palladium and rhodium, in an amount of 0.1 to 10 weight percent, calculated as metal. When the hydrogenating component is platinum or palladium, the recommended amount is 0.1 to 5.0 weight percent, preferably 0.5 to 2.5 weight percent. When the hydrogenating component is nickel, cobalt or iron, the recommended amount is 1 to 10 weight percent, preferably 1 to 5 weight percent. Hydrogen, in conjunction with the hydrogenating component of the catalyst, extends the life of the catalyst during catalytic dewaxing by preventing fouling of the pore openings of the catalyst. The catalyst may be preconditioned in hydrogen before use, at a temperature in the range 450° to 1000° F.

A mordenite-type zeolite in hydrogen form that is suitable for purposes of the process of said Republic of South Africa Pat. 67/3685 and for purposes of the present invention is the calcined synthetic "Zeolon H" mordenite sold commercially by the Norton Company.

As used hereinafter, the terms "mordenite," "hydrogen mordenite," and "mordenite in hydrogen form" are intended to include those mordenite-type zeolites indicated by said Republic of South Africa Pat. 67/3685 to be desirable as catalytic dewaxing catalysts or as components of catalytic dewaxing catalysts.

OBJECTS

In view of the continuing need for improvements in methods for producing high yields of low freeze point jet fuels from hydrocarbon feedstocks, and in view of the catalytic dewaxing advances disclosed in said Republic of South Africa Pat. 67/3685, it would be desirable if a combination process were available for converting to low freeze point jet fuel in high yields a hydrocarbon feedstock unsuitable as jet fuel because of an unacceptably high end point and an unacceptably high normal paraffin content, which process would utilize said advances disclosed in said Republic of South Africa patent.

DRAWING

The above and additional objects of the present invention, and the ways in which these objects are achieved, will better be understood from the following description when read in connection with the accompanying drawing, which is a diagrammatic illustration of apparatus and flow paths suitable for carrying out certain embodiments of the invention.

STATEMENT OF INVENTION

In accordance with the present invention there is provided a process for producing a jet fuel which comprises contacting a hydrocarbon feedstock boiling in the range 450° to 1100° F., containing substantial amounts of materials boiling above 600° F. and containing at least 5 weight percent, preferably 5 to 40 weight percent, more preferably at least 10 weight percent, and still more preferably 10 to 30 weight percent, normal paraffins in a first reaction zone with hydrogen and a hydrocracking-isomerization catalyst comprising a crystalline zeolitic molecular sieve component substantially free of any catalytic metal or metals, a silica-containing gel component, a Group VI hydrogenating component and a Group VIII hydrogenating component, at hydrocracking-isomerization conditions including a temperature in the range 400° to 950° F., preferably 750° to 850° F., a pressure in the range 500 to 3500 p.s.i.g., preferably 1000 to 2500 p.s.i.g., a liquid hourly space velocity in the range .1 to 10 volumes of said feedstock per volume of catalyst per hour, and a total hydrogen rate of 200 to 20,000 s.c.f., preferably 2000 to 8000 s.c.f., of hydrogen per barrel of said feedstock, and at a per-pass cracking conversion of said feedstock of more than 3 weight percent, preferably 40 to 80 weight percent, to products boiling below the initial boiling point of said feedstock, with accompanying isomerization of normal paraffins to isoparaffins, and catalytically dewaxing at least a portion of the effluent from said first reaction zone in a second reaction zone by contacting said portion with hydrogen and dewaxing catalyst comprising mordenite in hydrogen form and at least one hydrogenating component, at catalytic dewaxing conditions including a temperature in the range 400° to 900° F., preferably 550° to 750° F., a pressure in the range 100 to 2500 p.s.i.g., preferably 400 to 2000 p.s.i.g., a liquid hourly space velocity of .2 to 25 volumes of said feedstock per volume of catalyst per hour, and a total hydrogen rate of 200 to 20,000 s.c.f., preferably 2000 to 8000 s.c.f., of hydrogen per barrel of said feedstock, to produce a dewaxed product.

In a preferred embodiment said portion of the effluent from said first reaction zone that is dewaxed in said second reaction zone boils in the range 450° to 750° F., more preferably 450° to 600° F., contains less than 50 parts per million organic nitrogen, preferably less than 5 parts per million organic nitrogen and less than 100 parts per million organic sulfur, preferably less than 50 parts per million organic sulfur, and contains a substantially smaller weight percentage of normal paraffins than is contained in the portion of the hydrocarbon feedstock having the same boiling range. Despite certain language tending to teach to the contrary in said Republic of South Africa Pat. 67/3685, better results are obtained if the nitrogen and sulfur contents of the hydrocarbon feed to the second reaction zone are kept within the above limits.

In accordance with a further embodiment of the process of the present invention a fraction boiling below 450° F. is removed from the effluent from said first reaction zone and the portion of the effluent from said first reaction zone that is catalytically dewaxed in said second reaction zone boils above 450° F., preferably in the range 450° to 600° F. The portion of the effluent from said first reaction zone that boils above 600° F. may be recycled to said first reaction zone.

HYDROCRACKING CATALYST

The hydrocracking catalyst in the first reaction zone contains a unique combination of catalytic components in particular amounts, including silica, alumina, a Group VI component, a Group VIII component, and a crystalline zeolitic molecular sieve component that is substantially in the ammonium or hydrogen form and that is substantially free of any catalytic loading metal or metals. Said catalyst also may contain a Group IV component to advantage.

More particularly, said hydrocracking catalyst comprises:

(A) A gel matrix comprising:
 (a) At least 15 weight percent silica,
 (b) Alumina, in an amount providing an alumina-to-silica weight ratio of 15/85 to 80/20,
 (c) Nickel or cobalt, or the combination thereof, in the form of metal, oxide, sulfide or any combination thereof, in an amount of 1 to 10 weight percent, preferably 5 to 9 weight percent, of said matrix, calculated as metal,
 (d) Molybdenum or tungsten, or the combination thereof, in the form of metal, oxide, sulfide or any combination thereof, in an amount of 5 to 25 weight percent, preferably 10 to 20 weight percent, of said matrix, calculated as metal;

(B) A crystalline zeolitic molecular sieve substantially in the ammonium or hydrogen form, substantially free of any catalytic loading metal or metals, said sieve further being in particulate form and being dispersed through said matrix; said catalyst composite being further characterized by an average pore diameter below 100 angstroms and a surface area above 200 square meters per gram.

Said gel matrix further may comprise titanium, zirconium, thorium or hafnium or any combination thereof, in the form of metal, oxide, sulfide or any combination thereof, in an amount of 1 to 10 weight percent, preferably 5 to 9 weight percent, of said matrix, calculated as metal. Such additional Group IV component or components will impart improved characteristics, notably stability, to the catalyst.

Preferably said gel matrix comprises nickel and tungsten, in the form of the metals, oxides, sulfides, or any combination thereof. When a Group IV component is present, preferably it is titanium, in the metal, oxide or sulfide form, with titania being especially preferred. Said molecular sieve may be present in an amount of 1 to 70 weight percent of said composite.

A preferred embodiment of said hydrocracking catalyst comprises:

(A) A porous xerogel comprising:
 (a) At least 15 weight percent silica,
 (b) Alumina, in an amount providing an alumina-to-silica weight ratio of 15/85 to 80/20,
 (c) Nickel, in the form of metal, oxide, sulfide or any combination thereof, in an amount of 1 to 10 weight percent, preferably 5 to 9 weight percent, of said xerogel, calculated as metal,
 (d) Tungsten, in the form of metal, oxide, sulfide or any combination thereof, in an amount of 5 to 25 weight percent, preferably 10 to 20 weight percent, of said xerogel, calculated as metal, (B) A crystalline zeolitic molecular sieve, in an amount of 1 to 70 weight percent of said catalyst, said sieve being substantially in the ammonium or hydrogen form, and being substantially free of any catalytic loading metal or metals, said sieve further being in the form of particles, said particles being dispersed through said xerogel; said catalyst having an average pore diameter below 100 angstroms and a surface area above 200 square meters per gram.

Said porous xerogel further may comprise titanium, zirconium, thorium or hafnium or any combination thereof, in the forms and amounts previously discussed.

The hydrocarbon feed used in the present process may contain a substantial amount of organic nitrogen, because the first stage hydrocracking catalyst is extremely tolerant of organic nitrogen as well as of ammonia, and because the catalyst is an efficient hydrodenitrification catalyst.

The catalyst will accomplish hydrodenitrification and hydrocracking concurrently and efficiently. Preferably, however, the feed contains less than 1000 p.p.m. organic nitrogen. A suitable feedstock contains 25–1000 p.p.m., preferably 50–1000 p.p.m., organic nitrogen.

The reference to a crystalline zeolitic molecular sieve "substantially free of any catalytic loading metal or metals" means that the molecular sieve contains no more than 0.5 total weight percent of catalytic metal or metals, calculated as metal and based on the sieve, of which no more than 0.1 weight percent may be a noble metal or metals. The catalytic metal or metals include the Group VI and VIII metals.

It will be noted that the weight ratio of catalytic metal in the non-molecular sieve portion of the catalyst to catalytic metal in the molecular sieve portion of the catalyst is high. Certain prior art catalysts achieve a low catalytic metal loading of the molecular sieve component only with a concurrent very low metal content of the non-molecular sieve portion of the catalyst, and it has been found that such catalysts are inferior to the catalyst of the present invention.

DEWAXING CATALYST

The dewaxing catalyst in the second reaction zone, which comprises mordenite and at least one hydrogenating component, desirably will contain a Group VIII metal or metal compound hydrogenating component, preferably selected from the metals platinum, palladium, iridium, ruthenium, rhodium and nickel and compounds of said metals. Said dewaxing catalyst advantageously further may comprise carbon in an amount of at least 0.5 weight percent, based on the total catalyst. The carbon content of the catalyst may be obtained by contacting the catalyst with hydrogen and a heavy hydrocarbon distillate boiling in the range 500° to 1100° F., at a temperature in the range 400° to 900° F., a pressure in the range 500 to 3500 p.s.i.g., and a liquid hourly space velocity in the range 0.1 to 10, at a total hydrogen rate in the range 200 to 20,000 s.c.f. of hydrogen per barrel of said distillate, until the catalyst contains the desired amount of carbon. It has been found that the presence of the carbon in the catalyst makes the catalyst more selective for cracking normal paraffins, and therefore makes the catalyst a more efficient dewaxing catalyst.

The amount of the hydrogenating component present in the catalyst in the second reaction zone is discussed under Prior Art, above.

The dewaxing catalyst in the second reaction zone advantageously may contain rhenium, or a compound of rhenium, in an amount of 0.2 to 1.5 weight percent, calculated as metal and based on the total catalyst.

DISCUSSION OF DRAWING

Referring now to the drawing, there shown is a diagrammatic illustration of apparatus and flow paths suitable for carrying out the process of one embodiment of the present invention.

A hydrocarbon feedstock boiling in the range 450° to 1100° F. and containing at least 5 weight percent normal paraffins is supplied through line 1 to hydrocracking-isomerization zone 2, which is supplied with hydrogen through line 3. Said feedstock is hydrocracked and isomerized in zone 2 in the presence of a hydrocracking-isomerization catalyst as previously described and at conditions previously described. The effluent from zone 2 is passed through line 4 to separation zone 5, which may be a distillation zone, and is there separated into fractions, including:

(1) A C$_4$-fraction which is withdrawn through line 6;

(2) A 450° F.-fraction which is withdrawn through line 7;

(3) A fraction boiling in the range 450° to 600° F. which is passed through line 8 to dewaxing zone 9;

(4) A 600° to 750° F. fraction which is recycled from zone 5 to zone 2 through line 10.

The fraction entering zone 9 through line 8 is catalytically dewaxed in zone 9 in the presence of hydrogen entering zone 9 through line 11 and in the presence of the mordenite-containing dewaxing catalyst previously described, at the catalytic dewaxing conditions previously described. The effluent from zone 9, reduced in normal paraffin content compared with the fraction in line 8, is recovered from zone 9 through line 12 for use in part or in its entirety as a superior, low freeze point jet fuel. Said fraction may be further hydrogenated in a conventional manner, if desired, to further improve the smoke point thereof.

The hydrocarbons supplied to zone 9 through line 8 preferably have a limited nitrogen content and sulfur content, as previously described. This limited nitrogen content and sulfur content may be a result of already adequately low nitrogen and sulfur levels in the hydrocarbons in line 1 because of prior hydrofining or otherwise, or may be a result of subjecting the hydrocarbons in line 4 or line 8 to a separate, conventional hydrofining treatment.

EXAMPLES

The following examples are given for the purpose of further illustrating the process of the present invention. The examples are not intended to limit the scope of the invention.

EXAMPLE 1

A cogelled catalyst (Catalyst A) of the following composition was prepared.

| Component: | Weight percent of total catalyst |
|---|---|
| NiO | 10.0 |
| WO$_3$ | 24.5 |
| Al$_2$O$_3$ | 29.0 |
| SiO$_2$ | 25.5 |
| Crystalline zeolitic molecular sieve, "Y" form | 11.0 |
| Total | 100.0 |

The catalyst was prepared by the following steps, using sufficient quantities of the various starting materials to produce the above-indicated weight percentages of the components of the final catalyst:

(1) An aqueous acidic solution was prepared, containing AlCl$_3$, NiCl$_2$ and acetic acid.

(2) Three alkaline solutions were prepared: (1) a sodium silicate solution; (2) a sodium tungstate solution; and (3) an aqueous ammonia solution containing sufficient ammonia so that upon combining the alkaline solutions with the acidic solution coprecipitation of all of the metal-containing components of the solutions would occur at a neutral pH of about 7.

(3) The acidic and alkaline solutions were combined, and coprecipitation of all of the metal-containing components of the solutions occurred at a pH of about 7, resulting in a slurry.

(4) Linde ammonium "Y" crystalline zeolitic molecular sieve in finely divided form was added to the slurry.

(5) The molecular sieve-containing slurry was filtered to produce a molecular sieve-containing hydrogel filter cake, which was washed repeatedly with dilute ammonium acetate solution, to remove sodium and chloride ionic impurities from both the hydrogel and the molecular sieve contained therein.

(6) The molecular sieve-containing hydrogel was dried in an air-circulating oven and then was activated in flowing air for 5 hours at 950° F.

The finished catalyst was characterized by a surface area of 417 m.$^2$/g., a pore volume of 0.4 cc./g., and an average pore diameter of 38 angstroms, and a molecular sieve component substantially free of catalytic metals; that is, substantially all of the nickel and tungsten contained in the catalyst was located in the gel portion of the catalyst rather than in the molecular sieve component thereof.

EXAMPLE 2

A cogelled catalyst (Catalyst B) is prepared exactly as in Example 1, except that no molecular sieve component is incorporated therein. The amounts of starting materials are selected to provide a final catalyst with the same proportions of non-molecular sieve components as the catalyst of Example 1. The composition of the final catalyst is:

| Component: | Wt. percent of total catalyst |
|---|---|
| NiO | 11.2 |
| $WO_3$ | 27.5 |
| $Al_2O_3$ | 32.6 |
| $SiO_2$ | 28.7 |
| Total | 100.0 |

It will be noted that the weight percentage of each non-molecular sieve component of Catalyst A is 89% of the weight percent of the same component of Catalyst B, the addition 11 weight percent of Catalyst A being contributed by the molecular sieve component.

EXAMPLE 3

Portions of Catalyst A and B of Examples 1 and 2 are separately used to hydrocrack separate portions of a California gas oil feedstock, on a once-through basis.

The gas oil feedstock has the following characteristics:

| Boiling range, ° F. | 500–900 |
|---|---|
| Gravity, ° API | 19 |
| Organic nitrogen content, p.p.m. | 3000 |

The hydrocracking conditions are:

| Total pressure, p.s.i.g. | 2500 |
|---|---|
| Total hydrogen rate, s.c.f./bbl. | 10,000 |
| Liquid hourly space velocity, v./v./hr. | 0.8 |
| Per-pass conversion to products boiling below 550° F., vol. percent | 60 |
| Starting temperature, ° F. | (¹) |

¹ As indicated below.

The hydrocracking activities of the two catalysts, as measured by the starting temperatures necessary to achieve the indicated per-pass conversion, are:

| Catalyst: | Starting T, ° F. |
|---|---|
| A | 725 |
| B | 775 |

The 300°–550° F. jet fuel boiling range product in each case is of the same excellent quality, and suitable for further upgrading in the second stage of the process of the present invention, to a superior jet fuel.

The hydrocracked liquid product in each case is essentially free of organic nitrogen compounds, indicating that essentially complete hydrodenitrification accompanies the hydrocracking in each case.

From this example, it appears that: (1) the non-metal-loaded molecular sieve-containing gel catalyst (Catalyst A) has hydrocracking activity superior to that of a catalyst (Catalyst B) that does not contain a molecular sieve component but that is otherwise identical; and (2) the gel catalyst containing a non-metal-loaded molecular sieve component accomplishes essentially complete hydrodenitrification at a substantially lower temperature than Catalyst B.

EXAMPLE 4

A hydrocarbon feedstock is subjected to catalytic hydrocracking, with accompanying isomerization, and then to catalytic dewaxing in accordance with the process of the present invention. Details of the operation are as follows:

A. Hydrocarbon Feedstocks:

| | To first stage | To second stage |
|---|---|---|
| ASTM D-86 distillation: | | |
| ST/10% | 498/674 | 328/358 |
| 50% | 861 | 406 |
| 90%/EP | 1,028/1,055 | 506/544 |
| Gravity, °API | 22.4 | 45.2 |
| Organic sulfur, p.p.m | 23,800 | |
| Organic nitrogen, p.p.m | 720 | 0.4 |
| Freeze point, ° F | | −37 |
| Molecular weight | 372 | |
| Aniline point, ° F | | 153 |
| Paraffins, volume percent | | 42.6 |
| Naphthenes, volume percent | | 43.0 |
| Aromatics, volume percent | | 14.4 |
| Naphthalenes, volume percent | | |
| Smoke point, mm | | 27 |
| Normal paraffins, weight percent: | | |
| $C_9$ | | 1.80 |
| $C_{10}$ | | 2.09 |
| $C_{11}$ | | 1.00 |
| $C_{12}$ | | 0.29 |
| $C_{13}$ | | 0.47 |
| $C_{14}$ | | 0.40 |
| $C_{15}$ | | 0.49 |
| $C_{16}$ | | 0.62 |
| $C_{17}$ | | 0.40 |

B. Operating Conditions:

| | Hydrocracking isomerization catalyst (first stage) | Dewaxing catalyst (second stage) |
|---|---|---|
| Temperature, ° F | 746 | 520 |
| Pressure, p.s.i.g | 2,400 | 860 |
| LHSV, V./V./hr | 1.2 | 0.67 |
| Total hydrogen rate, s.c.f. of hydrogen per barrel of hydrocarbon feedstock | 5,000 | ¹ 5,600 |

¹ Adjusted by effect of reaction in upper bed.

C. Catalysts:

| | Hydrocracking-isomerization catalyst | Dewaxing catalyst |
|---|---|---|
| Hydrogenating component(s) | Nickel ¹, Tungsten ³ | Palladium.² |
| Other component(s) | Alumina ⁴, Silica ⁶, Titania ⁷, Crystalline zeolitic.⁸ | Mordenite,⁵ in hydrogen form. |

¹ 7.2 weight percent of total catalyst.
² 2.0 weight percent of total catalyst.
³ 18.0 weight percent of total catalyst.
⁴ 27.0 weight percent of total catalyst.
⁵ 98.0 weight percent of total catalyst.
⁶ 23.9 weight percent of total catalyst.
⁷ 7.2 weight percent of total catalyst.
⁸ Molecular sieve, "Y" type, in hydrogen form; 10.0 weight percent of total catalyst.

D. Second Stage Product Distribution:

| | Weight percent |
|---|---|
| Light gases, $C_4^-$ | 3.5 |
| $C_5$–300° F. gasoline | 3.9 |
| 300° F. plus jet fuel | 92.6 |
| Freeze point of 300° F. plus jet fuel, ° F. | −56 |

From this example, it will be seen that the freeze point of the jet fuel boiling range materials has been reduced in the second stage from −37° F. to −56° F.

What is claimed is:

1. A process for producing a jet fuel which comprises contacting a hydrocarbon feedstock boiling in the range 450° to 1100° F., containing substantial amounts of materials boiling above 600° F. and containing at least 5 weight percent normal paraffins in a first reaction zone with hydrogen and a hydrocracking-isomerization catalyst comprising a crystalline zeolitic molecular sieve component substantially free of any catalytic metal or metals, a silica-containing gel component, a Group VI hydrogenating component and a Group VIII hydrogenating component, at hydrocracking-isomerization conditions including a temperature in the range 700° to 900° F., a pressure in the range 500 to 3000 p.s.i.g., a liquid hourly space velocity in the range 0.1 to 10 volumes of said feedstock per volume of catalyst per hour, and a total hydrogen rate of 200 to 20,000 s.c.f. of hydrogen per barrel of said feedstock, and at a per-pass cracking conversion of said feedstock of more than 30 weight percent to products boiling below the initial boiling point of said feedstock, with accompanying isomerization of normal paraffins to isoparaffins, and catalytically dewaxing at least a portion of the effluent from said first reaction zone in a second reaction zone by contacting said portion with hydrogen and a dewaxing catalyst comprising mordenite in hydrogen form and at least one hydrogenating component, at catalytic dewaxing conditions including a temperature in the range 400° to 900° F., a pressure in the range 100 to 2500 p.s.i.g., a liquid hourly space velocity of 0.2 to 25 volumes of said feedstock per volume of catalyst per hour, and a total hydrogen rate of 200 to 20,000 s.c.f. of hydrogen per barrel of said feedstock, to produce a dewaxed product.

2. A process as in claim 1, wherein said feedstock contains at least 10 weight percent normal paraffins.

3. A process as in claim 1, wherein said portion of the effluent from said first reaction zone that is dewaxed in said second reaction zone boils in the range 450° to 750° F., contains less than 10 parts per million organic nitrogen and less than 50 parts per million organic sulfur, and contains a substantially smaller weight percentage of normal paraffins than are contained in the portion of said hydrocarbon feedstock having the same boiling range.

4. A process as in claim 3, wherein said portion of the effluent from said first reaction zone that is dewaxed in said second reaction zone boils in the range 450° to 600° F.

5. A process as in claim 1, wherein said first reaction zone is operated at a per-pass cracking conversion of said feedstock in the range 40 to 80 weight percent of products boiling below the initial boiling point of said feedstock, and wherein a fraction boiling below 450° F. is removed from the effluent from said first reaction zone and wherein said portion of the effluent from said first reaction zone that is catalytically dewaxed in said second reaction zone boils above 450° F.

6. A process as in claim 1, wherein a portion of the effluent from said first reaction zone that boils above 600° F. is recycled to said first reaction zone and wherein the portion of the effluent from said first reaction zone that is catalytically dewaxed in said second reaction zone boils in the range 450° to 600° F.

7. A process as in claim 1, wherein said dewaxing catalyst further comprises at least 0.5 weight percent carbon, based on the total catalyst.

References Cited
UNITED STATES PATENTS

| | | | |
|---|---|---|---|
| 3,487,005 | 12/1969 | Egan et al. | 208—59 |
| 3,539,498 | 11/1970 | Morris et al. | 208—111 |
| 3,536,604 | 10/1970 | Jaffe | 208—59 |
| 3,132,087 | 5/1964 | Kelley et al. | 208—60 |

HERBERT LEVINE, Primary Examiner

U.S. Cl. X.R.

208—15, 97, 111, Dig 2